US012047622B2

(12) United States Patent
Patel et al.

(10) Patent No.: US 12,047,622 B2
(45) Date of Patent: Jul. 23, 2024

(54) GENERATED MESSAGING TO VIEW CONTENT ON MEDIA DEVICES

(71) Applicant: TIVO SOLUTIONS INC., San Jose, CA (US)

(72) Inventors: Pratik Hasmukh Patel, Dunham, NC (US); David Stuart Luks, Chapel Hill, NC (US); Thomas William Becker, Raleigh, NC (US); Bryan Stephen Scappini, Cary, NC (US); Doug Mittendorf, Durham, NC (US); Richard Lee, San Jose, CA (US); Kevin P. Smith, San Jose, CA (US)

(73) Assignee: TiVo Solutions Inc., San Jose, CA (US)

( * ) Notice: Subject to any disclaimer, the term of this patent is extended or adjusted under 35 U.S.C. 154(b) by 251 days.

(21) Appl. No.: 16/843,500

(22) Filed: Apr. 8, 2020

(65) Prior Publication Data

US 2020/0304850 A1    Sep. 24, 2020

Related U.S. Application Data

(63) Continuation of application No. 15/486,033, filed on Apr. 12, 2017, now Pat. No. 10,652,599.

(51) Int. Cl.
| | |
|---|---|
| *H04N 21/25* | (2011.01) |
| *H04N 21/258* | (2011.01) |
| *H04N 21/262* | (2011.01) |
| *H04N 21/442* | (2011.01) |
| *H04N 21/45* | (2011.01) |
| *H04N 21/466* | (2011.01) |

(52) U.S. Cl.
CPC ..... *H04N 21/251* (2013.01); *H04N 21/25891* (2013.01); *H04N 21/26241* (2013.01); *H04N 21/44224* (2020.08); *H04N 21/4532* (2013.01); *H04N 21/4668* (2013.01)

(58) Field of Classification Search
CPC .......... H04N 21/251; H04N 21/25891; H04N 21/26241; H04N 21/44224; H04N 21/4532; H04N 21/4668
See application file for complete search history.

(56) References Cited

U.S. PATENT DOCUMENTS

| | | | |
|---|---|---|---|
| 7,003,792 | B1 | 2/2006 | Yuen |
| 7,328,450 | B2 | 2/2008 | Macrae et al. |
| 8,613,020 | B2 | 12/2013 | Knudson et al. |
| 8,628,864 | B2 | 1/2014 | Abe et al. |
| 8,943,539 | B2 | 1/2015 | Hamano et al. |

(Continued)

*Primary Examiner* — John W Miller
*Assistant Examiner* — Akshay Doshi
(74) *Attorney, Agent, or Firm* — Haley Guiliano LLP

(57) ABSTRACT

Techniques, systems, and methods are disclosed to generate messaging to view content on media devices based on predictive factors. Information may be received to trigger one or more predictive factors and then generate a candidate set of offers to view content at a media device based on the information. Based on the one or more predictive factors, confidence values may be determined for each offer in the candidate set of offers. The candidate set of offers may be ranked based on the associated confidence values. Subsequently, presentation of at least one offer of the candidate set of offers may be caused to display in a user interface screen on the media device based on the ranking.

17 Claims, 4 Drawing Sheets

(56) References Cited

U.S. PATENT DOCUMENTS

| | | | |
|---|---|---|---|
| 9,015,750 B2 | 4/2015 | Knee et al. | |
| 9,135,645 B2 | 9/2015 | Yates | |
| 9,361,373 B1* | 6/2016 | Price | H04N 21/2668 |
| 9,628,864 B2 | 4/2017 | Ellis | |
| 9,667,903 B2 | 5/2017 | Schein et al. | |
| 9,906,837 B1* | 2/2018 | Docherty | H04N 21/4147 |
| 10,652,599 B2 | 5/2020 | Patel et al. | |
| 2006/0263041 A1* | 11/2006 | Gustta | H04N 7/163 |
| | | | 386/237 |
| 2009/0077589 A1 | 3/2009 | Boyer et al. | |
| 2010/0319013 A1 | 12/2010 | Knudson et al. | |
| 2011/0107374 A1* | 5/2011 | Roberts | H04N 21/6582 |
| | | | 725/50 |
| 2012/0197732 A1 | 8/2012 | Shen et al. | |
| 2014/0136526 A1 | 5/2014 | Calhoun | |
| 2015/0201244 A1 | 7/2015 | Schein et al. | |
| 2016/0014461 A1 | 1/2016 | Leech et al. | |
| 2016/0142783 A1* | 5/2016 | Bagga | H04N 21/47214 |
| | | | 725/47 |
| 2018/0302677 A1 | 10/2018 | Patel et al. | |

* cited by examiner

GENERATED MESSAGING TO VIEW CONTENT ON MEDIA DEVICES

CROSS-REFERENCE TO RELATED APPLICATIONS

This application is a continuation of U.S. patent application Ser. No. 15/486,033, filed Apr. 12, 2017. The disclosure of which is hereby incorporated by reference herein in its entirety.

FIELD OF THE DISCLOSURE

The present disclosure relates to the field of media devices. The disclosure relates more specifically to techniques for generating messages to view content on media devices based on predictive factors.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

The introduction of the DVR to the consumer world has revolutionized the way users watch and record television programs. DVRs eliminate many of the complications of VCRs and the need for video tapes. DVRs record television programs and media content on a storage drive that is capable of storing a large amount of content. Because DVRs are usually box-like in shape, and are often found sitting on top of the television sets to which they are connected, DVRs typically are included in the broad category of devices now called "set-top boxes." Much like VCRs, DVRs receive one or more television signals (which may represent television programs and/or movies) as input from cables or satellite dishes, (or, in some cases, unlike VCRs, from broadband network connections) and also output television signals to a television set or other display.

A DVR's user can instruct the DVR to schedule, for recording, specified content that may be broadcasted or otherwise transmitted to the DVR at some future time. Thus, the user can schedule the automatic recording of the content in advance of the time that the DVR will receive the content. For example, the user can instruct the DVR to record unspecified content that will be broadcasted on a specified channel beginning at a specified date and time and ending at another specified time. For another example, the user can instruct the DVR to record a specified showing (on a specified channel, and beginning at a specified date and time) of a specified movie, specified event, or specified episode of a multi-episode television series. For another example, the user can instruct the DVR to record the next to-be-broadcasted instance of a specified movie, specified event, or specified episode of a multi-episode television series without specifying the date, time, or channel on which that instance will be broadcasted. For another example, the user can instruct the DVR to record all (or all first-run) episodes of a multi-episode television series on a specified channel without specifying the dates or times at which those episodes will be broadcasted. For another example, the user can instruct the DVR to record all (or all first-run) instances of movies, events, or episodes of a multi-episode television series that are associated with a specified keyword, a specified actor, and/or a specified director without specifying the titles, channels, or broadcasting times of those instances.

Other consumer electronics devices also allow for the recording and viewing of content not based upon traditional broadcast or cable delivery. For example, devices might obtain content via broadband network connections. Apple TV® is an example of this type of device. Users may purchase content over the network and have the content be delivered based upon IP or any other communications protocol. Devices that employ Internet Protocol Television (IPTV) may also be used. IPTV is a system where a digital television service is delivered using Internet Protocol over a network infrastructure. Rather than using broadcast or cable, all content is exclusively delivered over an IP network architecture. An example of such a service is U-Verse® by AT&T®. Devices may also use a hybrid of IPTV and standard delivery. Verizon FiOS TV®, for example, delivers Video On Demand (VOD) content and interactive features, over IP but the vast majority of content, including Pay Per View (PPV), is provided over a standard broadcast video signal which carries both analog and digital content. Other devices may act as a receiver to deliver content from a number of different delivery devices, such as DVRs, DVD players, IPTV, etc. that are connected to the device.

Because of the wide variety of content that is available for viewing with DVRs and any other device capable of storing and displaying content, providing offers for particular media or digital content has become increasingly important. One difficulty of surfacing, or providing, media or digital content to a user is the difficulty of predicting what content the user would like to view. Thus, methods that tailor discoverable content to the user are important.

DETAILED DESCRIPTION

Figure 1:
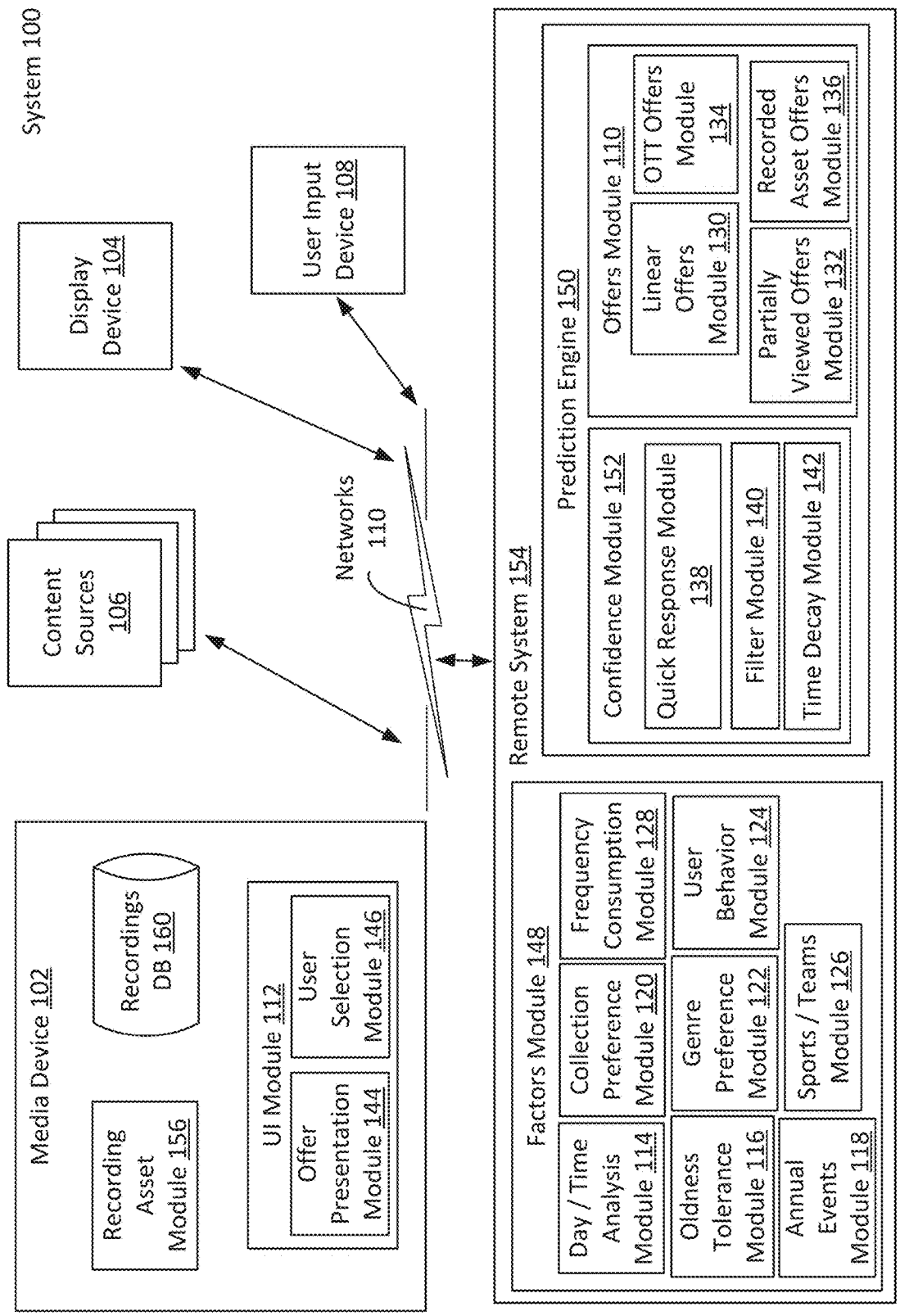
FIG. 1 depicts a high level block diagram of an example networked computer environment in which an embodiment may be implemented.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:
   1.0. General Overview
   2.0. Operating Environment
   3.0. Functional Overview
      3.1. Predictive Factors
      3.2. Offer Generation
      3.3. Offer Presentation
   4.0. Implementation Mechanism—Hardware Overview
   5.0. Extensions and Alternatives

1.0 General Overview

Approaches, techniques, and mechanisms are disclosed related to providing content discovery, and predicting content items that a user may want to watch now based on user viewing behavior habits. In this context, a "content item" may include full length television episodes, movies, television series, movie genre, collections of content, user lists of content, clips of other content items, and any other type of media, such as a broadcasted television program, movie, sporting event, awards show, music video, advertisement, and so on.

Users are creatures of habit. A remote system, having one or more computing resources in a networked environment, may collect user behaviors, such as viewing a rerun of a syndicated television show such as WILL & GRACE that is broadcasted at 7 pm on Wednesday nights. The user may have a high affinity for the television series WILL & GRACE and have a high tolerance for viewing old content items, based on original air date. Information about the user, as well as other information such as programming information, content availability on video platforms, and so forth may be used to determine predictive factors that may be associated with content to offer to a user for viewing at any time.

In an embodiment, generating offers to view content on media devices based on predictive factors refers generally to one or more processes for determining confidence values, or scores, to be associated with a content item. The predictive factors may be based on the information gathered about a user based on the user's viewing habits, completion of content items, abandonment of content items (e.g., starting to watch, but not completing the content item), and so on. Offers to view content may be organized and presented in a user interface screen provided by a media device, such as a DVR, cloud DVR, networked DVR, or other media serving device, where the user interface screen may include one or more feeds, carousels of content, and so on. An offer may also be a recommendation, a notification, a call to action, a message, or any other communication of an item of interest to a user based on the recordings stored and available at a media device.

In one example, a user may be presented with an offer to view content based on a day and time analysis factor that strongly links the particular day and time combination with a desire to view an episode that is being broadcasted currently, or ready-to-tune, or is available through one or more over-the-top (OTT) methods of media consumption. Returning to the example of Wednesdays at 7 pm being a day and time combination associated with the content item WILL & GRACE, the remote system may generate an offer to view content that is currently being broadcast with a ready-to-tune offer, enabling the user to automatically view the episode upon accepting the offer. This greatly improves the user experience in reducing the time to view content that the user desires to watch. In other examples, other factors may be used to generate offers to view content, and different offers may be presented alongside each other based on the different types of content that the remote system has determined to be of interest to the user. For example, a user may watch content on a mobile device during a commute home on a train. The mobile device may be a media device that has limited capability in playing content based on network signal strength. As a result, an offer to view content on the mobile device may take into account the device's capabilities and availability of content to play on that device.

In one embodiment, techniques are provided for determining confidence values for content tailored to a user's preferences based on viewing habits and behaviors. Confidence values may take into account various user behaviors, such as frequently watching, in one session, episodes in a serial fashion of a television series. As a result of identifying such a "binge watching" behavior, it may be determined that the very next episode in the series is overwhelmingly favored and/or predicted. A time decay may be introduced in the computation of the confidence values based on how recently the content was consumed.

In an embodiment, a media device is configured to provide and report back user behavior data, such as selection of generated and/or predicted offers to view content. A remote system may adjust or update confidence values based on a user's response to a generated offer. In one embodiment, an offer may be generated in real-time based on a request from a user. Real-time generated offers may use different techniques based on a user's expectation of a rapid response.

2.0. Operating Environment

FIG. 1 is a block diagram of an example system 100 for generating offers to view content on media devices based on predictive factors, in accordance with one or more embodiments. System 100 comprises one or more computing devices. These one or more computing devices comprise any combination of hardware and software configured to implement the various logical components described herein. For example, the one or more computing devices may include one or more memories storing instructions for implementing the various components described herein, one or more hardware processors configured to execute the instructions stored in the one or more memories, and various data repositories in the one or more memories for storing data structures utilized and manipulated by the various components.

In one embodiment, a system 100 includes one or more media devices 102 and one or more display devices 104. As used herein, a media device 102 and display device 104 generally refers to any type of computing device capable of receiving media content items, such as television programs, movies, video on demand (VOD) content, etc., from a cable signal, terrestrial signal, digital network-based data, another media device, etc. In FIG. 1, for example, a media device 102 may include a TV-tuner input that can be used to play, record, stream, and/or otherwise access media content items received from one or more content sources 106. For example, one content source 106 may include a live television feed that is provided by a cable operator; other example content sources 106 include, but are not limited to, Video On Demand (VOD) libraries, third party, or over-the-top (OTT), content providers (e.g., Netflix®, Amazon Prime®, etc.), web-based media content, satellite broadcast content, terrestrial broadcast content, etc. Example media devices 102 include, but are not limited to, a set-top box (STB), digital video recorders (DVRs), personal computers, tablet computers, handheld devices, televisions, and other computing devices.

In an embodiment, system 100 may further include one or more IP-enabled display devices 104. In general, an IP-enabled display device 104 may refer to any type of computing device that is capable of receiving media content over one or more digital networks 110, such as the public Internet, intranet, LAN, WAN, etc., but which may or may not include a TV-tuner input. Examples of portable devices 104 include, without limitation, STBs, DVRs, personal computers, smartphones, tablets, laptops, game devices, media servers, digital media receivers, televisions, terrestrial antennas, etc. A typical user may own several media devices 102 and/or display devices 104, which may be located and used at various locations throughout the user's home and elsewhere. A typical user may employ a user input device 108 connected to a media device 102 through a network 110.

In an embodiment, system 100 may include remote systems 154 that are communicatively coupled to a media device 102 through one or more networks 110. A media device 102 and display device 104 may also be communicatively coupled to a one or more content sources 106 via one or more networks 110. Networks 110 broadly represent one or more LANs, WANs, cellular networks (e.g., LTE, HSPA, 3G, older technologies, etc.), and/or internetworks using any of wired, wireless, terrestrial microwave, or satellite links, and may include the public Internet. Furthermore, each media device 102 and display device 104 may be coupled to one or more other media devices via one or more networks 110.

3.0 Functional Overview

FIG. 1 further illustrates an example media device 102 that includes a user interface (UI) module 112, a recording asset module 156, and a recordings database (DB) 160. FIG. 1 also illustrates content sources 106, one or more remote systems 154, a display device 104, and a user input device 108, each connected to the media device 102 through networks 110.

3.1 Predictive Factors

One or more remote systems 154 may include various modules to provide information that triggers predictive factors used by media devices to generate offers to view content based on the predictive factors, in accordance with one or more embodiments. Although FIG. 1 illustrates a remote system 154 having a factors module 148 and a prediction engine 150, one skilled in the art may understand that the functionality described in the various modules may be distributed among multiple remote systems 154, such as one or more remote servers, communicatively coupled through one or more networks 110. For simplicity, only one remote system 154 is illustrated. A factors module 148 may be used to identify and determine factors, per user, that trigger associated offers of content to be presented for user consumption. A factors module 148 may include a day/time analysis module 114, an oldness tolerance module 116, an annual events module 118, a collection preference module 120, a genre preference module 122, a user behavior module 124, a sports/teams module 126, and a frequency consumption module 128.

A day/time analysis module 114 may track user viewing habits at particular days and times. For example, a user may watch a specific series on Wednesdays after 6 pm, such as BIG BANG THEORY, knowing that a new episode will be recorded by then. As a result, the specific day and time combination may be a predictive factor in presenting an offer to the user to watch the series associated with the day and time. In another embodiment, the day/time analysis module 114 may determine from historical user viewing habits that a particular genre of television shows and movies, such as Romantic Comedy, is watched on Saturdays at 8 pm. Thus, that particular day and time combination may be associated with the Romantic Comedy genre. In a further embodiment, the day/time analysis module 114 may associate other types of user viewing habits with particular day/time combinations, such as sports, special events, next episode in series, collections, previously watched content, binge watching or marathon watching behavior, and the like. The day/time analysis module 114 may operate in conjunction with other modules in the factors module 148 to associate types of content with day/time combinations. In one embodiment, a content type affinity may be generated as a predictive factor to determine what type of content an individual will want to watch at any given day/time. For example, there may be a television series that is watched at primetime on weeknights versus movies that are watched on Saturday night during family time. Depending on available metadata, a content type affinity may be made as granular as sitcoms versus hour-long shows, daily's versus weekly's, and so forth.

An oldness tolerance module 116 may determine a level of tolerance a user has for "old" contents and/or offers (by airing or release date), by which oldness reduces confidence. For example, a user may have a high tolerance in watching content, such as watching episodes of SEINFELD, SEX AND THE CITY, GOLDEN GIRLS and other series that run in syndication. As a result, the oldness of an episode may not reduce confidence based on the high tolerance computed for the user. As another example, a user may have a lower tolerance for old contents/offers based on viewing habits of watching the newest episode of series that the user is watching. In this case, the user's low tolerance for oldness impacts the confidence score for available content.

An annual events module 118 may track and determine a user's habit in recording and viewing special annual events. For example, the user may have previously viewed past Superbowl games. As a result, future Superbowl games may be weighted based on the user's past viewing habits. Other examples of annual events include award shows such as the Oscars, the Tonys, the Emmys, and MTV Video Music Awards. The annual events module 118 may determine that a particular annual event tied to a particular day/time combination may have a higher confidence score based on the past viewing habits of the user.

A collection preference module 120 may identify a user's affinity for collections, or groupings, that may be available through the media device 102. For example, a collection associated with STAR TREK may include all movies and series associated with STAR TREK. Based on the user's viewing habits of content items with in a particular collection, an affinity for the particular collection may be determined. The affinity for the particular collection may impact a confidence score for a particular content item based on its inclusion in the particular collection. In one embodiment, a user may be "binge watching" a television series, such as 24, and as a result, the user's affinity for the "24 Collection" may be very strong during the binge watching time while less strong at other times. The collection preference module 120 may determine the user affinity score associated with a particular collection based on user viewing multiple content items within the collection.

A genre preference module 122 may determine an affinity for a particular genre based on the user's past viewing habits for the particular genre of content. In one embodiment, a "favorite" genre may be determined by the genre preference module 122 based on the past viewing habits of the user. In another embodiment, the genre preference module 122 may determine top genres associated with day/time combinations as well as other ways to categorize viewing behavior, such as content type (e.g., movies, television shows, clips), view type (e.g., linear, DVR play, OTT, VOD, etc.), age appropriateness, channel, and device (e.g., STB, mobile, etc.). For example, a mobile device may be used to primarily watch Comedy shows or clips of short duration. Thus, a favorite genre of Comedy clips may be determined by the genre preference module 122 and associated with potential offers to be presented on the mobile device.

A user behavior module 124 may track user behavior with respect to presented offers based on the one or more predictive factors. A user may select an offer based on the one or more predictive factors. This user behavior may strengthen the associated predictive factors by adding more weight to the factors that were used to present the offer. Conversely, the user may reject an offer, in one embodiment, by not selecting the offer presented based on the one or more predictive factors. In rejecting the offer, the impact of the factors on the confidence score may be reduced by the user behavior module 124. In other embodiments, the user behavior module 124 may track the user behavior with respect to the presented offers in a data store or table. For example, a presented offer may be tagged as accepted or declined by the user behavior module 124.

A sports/teams module 126 may identify particular types of sports, leagues, and teams that may be of strong interest to one or more users of the media device 102 based on past view events, recorded assets, and the like. For example, based on the viewing habits being reported by the media device 102 that many NBA games with the GOLDEN STATE WARRIORS have been watched and/or recorded, an affinity for each of the NBA and for the GOLDEN STATE WARRIORS may be determined by the sports/teams module 126. As a result, based on the affinity for the NBA, an offer to watch a currently playing NBA game may have more weight added in computing the confidence score of the offer.

A frequency consumption module 128 may identify a rate of consumption that is indicative of a user's tendency to watch related content in succession. For example, there may be 48 episodes of a series, including multiple seasons. The frequency consumption module 128 may determine that a user is in a "binge watching" mode, meaning that the user is watching related content in succession, such as episodes of a television series, movies in a series of movies (such as Star Trek I-V, Lord of the Rings, etc.), and portions of mini-series dramas. A rate of consumption may be a predetermined threshold, in one embodiment. In another embodiment, other measures or metrics may be used to determine that the user is in a "binge watching" mode, such as watching more than one episode of a series. In a further embodiment, an "addiction" use-case algorithm may be applied to determine a strong affinity for the television series or movie series based on how quickly the user has watched content.

A prediction engine 150 may include a confidence module 152 that determines a confidence score associated with an offer. The confidence module 152 may include a quick response module 138, a filter module 140, and a time decay module 142. A prediction engine 150 may rely on an episode relevancy function that computes the relevancy of an episode for a given user and/or profile based on the user and/or profile's past viewing history and habits of the episode's parent series. If the user and/or profile has never watched any episodes of the series, the population-wide viewership of the series is taken into account to determine whether to favor either the first or the latest episode. If there is no population-wide viewership, then the first episode is favored.

A confidence module 152 may be used to determine a confidence score associated with an offer to watch and/or record a content item. For example, an algorithm may be used by the confidence module 152 that uses a notion of slots to help ensure a varied blend of content types are returned. Types of content for slots may include series, series recommendation, movie genre, sports event, and special. For series, a series day/time affinity may be used to determine a confidence score for particular content items. As mentioned above, if a user regularly watches the latest episode of a series, such as THE DAILY SHOW, at a certain day/time combination, it is a strong indicator that at the next particular day/time combination, the user will want to watch the latest episode of the series. In one embodiment, a next episode algorithm may be used to select the next available episode in the series.

A confidence module 152 may use other factors from the factors module 148 to determine various confidence scores for content items. For example, for series recommendations, a popularity score may be determined for a popular series over the last 30 days as watched and/or recorded by other users. Linear content that was popular during the same time-slot the previous week may also be associated with a determined popularity score. One or more types of popularity scores may contribute to a confidence score for a content item as determined by the confidence module 152.

A quick response module 138 may determine a particular content item based on the "binge watching" use case. Once it is determined that a user is in a binge mode, the quick response module 138 may present the next recorded episode in the series immediately after the user finishes viewing a content. The quick response module 138 may use other factors in determining one or more immediate offers to watch content, such as day/time analysis, user behavior, and frequency consumption. In one embodiment, the quick response module 138 responds only to the binge watching use case, based on a determination that the user is frequently consuming content of a particular series or movie genre or other parent content. In another embodiment, the quick response module 138 may be used to generate additional predicted offers in real-time upon request from a user.

A filter module 140 may filter content from being associated with an offer to watch content. For example, lists of blacklisted content items may be created for a user based on explicit user indications that a specific collection, offer, asset should not be presented or shown as a predicted offer. In another embodiment, a user may have selected settings to preclude types of content or groupings of collections from being presented as an offer based on predictions, such as "adult" collections. In a further embodiment, groupings of collections may be precluded from being presented as offers by the filter module 140 as determined by administrators of the system 100. Additionally, content may be filtered based on availability, in one embodiment, based on a user's entitlements. Content may be available through linear content, video-on-demand (VOD), OTT, by device, for purchase or for rent, and so forth.

A time decay module 142 may determine various time decay values associated with confidence scores. Various factors may provide boosts in confidence scores, such as day/time analysis, partially viewed content, frequency consumption, and so forth. However, a particular time decay may be applied for each boost and may be determined based on the type of factor causing the boost in confidence score. Newly purchased and/or rented episodes may be determined to have a boosted confidence score by the confidence module 152. The value of the boost may linearly decay from 1 to 0 over a 14-day period, for example. Similarly, newly recorded episodes may also be boosted by the confidence module 152. The value of that boost may linearly decay from 1 to 0 over a 3-day period, for example. Other boost values may be determined by the confidence module 152, such as boosting, by a fixed amount, series with episodes referenced from purchases and/or rentals where the expiration date is within 48 hours of the current time. In selecting a child content item of a parent content item, such as an episode of a series or a movie of a movie genre, the confidence module 152 may also provide a boost for partially viewed content where the user stopped watching the content within the last 48 hours, for example. Other time decay algorithms may be used by the time decay module 142.

3.2 Offer Generation

The prediction engine 150 may also include an offers module 110 that generates offers to perform an action in association with a content item. Such actions may include playing, recording, or setting a reminder to watch a content item. The offers module 110 may include a linear offers module 130, a partially viewed offers module 132, an over-the-top (OTT) offers module 134, and a recorded asset offers module 136.

A linear offers module 130 may generate offers that are available on a "ready-to-tune" linear basis, meaning the offer is currently broadcasting or is within 10 minutes of broadcasting and excluding broadcasts that are within 5 minutes of ending. Read-to-tune may also include programs included in a short term cache for network DVR installations, in an embodiment.

A partially viewed offers module 132 may generate offers to view content that has been partially viewed by the user. For example, a user may have started an episode of a television series but stopped watching to view a different content item or for some other reason. Partially viewed offers may have a predetermined confidence level based on a presumption that the user desires to finish the content item. Based on the recordings stored at the media device 102, offers may be generated to encourage users to finish content that has been partially viewed.

An over-the-top (OTT) offers module 134 may generate offers to view content available "over-the-top," meaning that the content may be available through a third party or over the top of a set top box, such as Netflix, HULU, Amazon, and the like. Third parties may generate offers for presentation on the media device 102, and the OTT offers module 134 may manage those third-party generated offers, in an embodiment. In other embodiments, the offers module 110 may determine availability of a predicted content that is provided by a third party by using the OTT offers module 134. For example, if a user does not have access to a content offered by a third party, the offer may include an option to subscribe, purchase, rent, or otherwise make available the content through a transaction with the third party.

A recorded asset offers module 136 may generate offers to view content based on the available recorded assets stored in the recording DB 160. Recorded asset means the program has started recording regardless if the recording has completed or not. The possible set of recorded-assets that can be selected for a prediction includes all recorded-assets at the time which the client requests for a prediction. For network DVR installations, recorded-asset may also include programs included in a long-term cache.

Other offers may be generated based on prior subscriptions to collections to which a content and/or offer may belong. An offer may be generated by the offers module 110 based on a confidence score, generated by the confidence module 152. The confidence score may reflect a confidence in whether the offer will be selected by the user, with the highest confidence offer presented first, in an embodiment. In other embodiments, offers may be presented according to a slot based algorithm, described above, to ensure a variety in types of predicted offers presented. For each slot associated with a content type, the content with the highest confidence scores presented first. For example, if there are two slots for series, two slots for series recommendations, one slot for special events, one slot for genre, and two slots for partially viewed content, the highest scoring content based on confidence may be presented for each type of slot. In this way, a variety metric is determined for each offer in the set of candidate offers.

3.3 Offer Presentation

The media device may further include a user interface (UI) module 112. The UI module 112 may include an offer presentation module 144 and a user selection module 146. The offer presentation module 144 may present offers generated by the offers module 110 as described above. In one embodiment, the offer presentation module 144 may present offers according to a slot based algorithm to ensure a variety of content types. In another embodiment, the offer presentation module 144 may present offers based on confidence level in a feed. In further embodiments, the offer presentation module 144 may present offers in any combination of user interfaces generated by the UI module, such as a carousel, a feed, a popup window, and so forth. The offer presentation module 144 may display the offer through a user interface provided by the media device 102 on a display device 104.

A user selection module 146 may receive a user selection of an offer based on user input received from a user input device 108. Upon selection of the offer, the content associated with the offer is delivered from a content source 106 or a recordings DB 106 to the display device 104 by the media device 102. A media device 102 may report back various information items to the remote system 154 to be stored in association with the user and/or profile. For example, the 50 most recently completed movies, 25 most recently abandoned movies (movies not completed), 25 most recently abandoned episodes, and per series, 25 most recently completed episodes, syndication number high-watermark, latest confidence value, next confidence value, and random confidence value.

Figure 2:
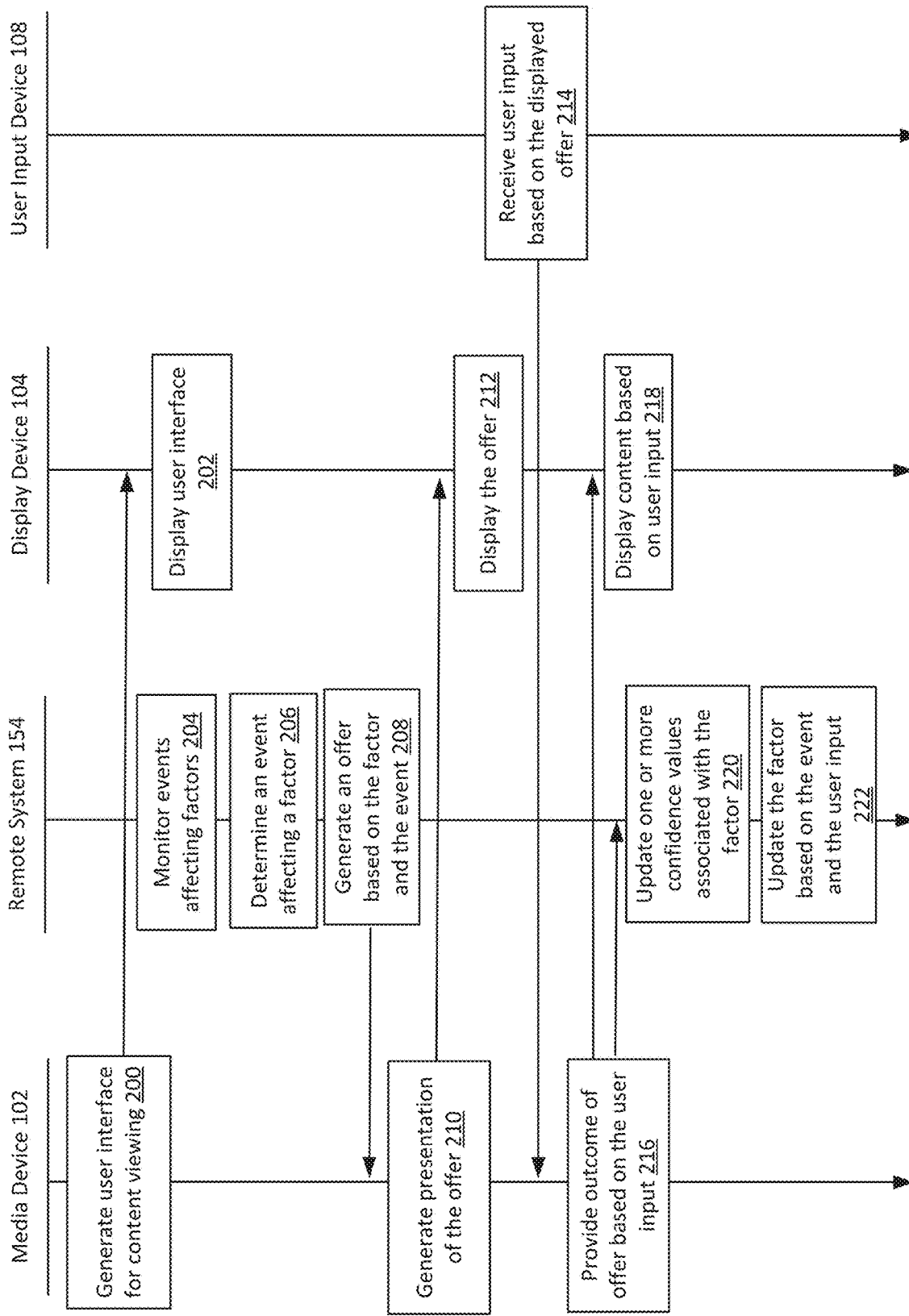
FIG. 2 depicts an interaction flow diagram of an example networked computer environment in which an embodiment may be implemented.

FIG. 2 depicts an interaction flow diagram of an example networked computer environment in which an embodiment may be implemented. A media device 102, a remote system 154, a display device 104, and a user input device 108 may be connected by one or more networks, as described above. A media device may generate 200 a user interface for viewing content on the display device 104. The display device 104 may display 202 the user interface as a result. The remote system 154 may monitor 204 events affecting factors. Such events may include a day/time analysis to determine a habit of a user to watch a specific type of content, such as the latest episode of a series, a rerun of a syndicated series, a movie of a particular movie genre, a sports event or team game, special events that occur annually, and so forth. Remote servers may then determine 206 an event affecting a factor and subsequently generate 208 an offer based on the factor and the event. This offer may be communicated to the media device 102. In one embodiment, the media device 102 may create its own offers based on what has been recorded. The media device may then generate 210 presentation of the offer on the display device 104 on the user interface. The display device 104 may display 212 the offer as a result.

The user input device 108 may receive 214 user input based on the displayed offer and may communicate the user input to the media device 102. The media device 102 may then provide 212 an outcome of the offer based on the user input. For example, the offer may have been selected such that the display device 104 displays 218 content associated with the offer. Alternatively, the offer may have been rejected and the user may have selected a different content to view. The display device 104 displays 218 content based on user input as a result. The remote system 154 updates 220 one or more confidence values associated with the factor based on the outcome of the offer. For example, if the user selects the offer, then the prediction is validated and a greater weight may be assigned to the factor in the future. In one embodiment, the one or more confidence values associated with the factor may be "boost" values as described above. In another embodiment, the confidence values may be "affinity" values as described above.

The factor may then be updated 222 based on the event and the user input. For example, the factor may be a day/time analysis that the user watches a latest episode of a series at 6 pm on Thursdays. However, the user input may have not selected to watch the latest episode at the appointed day/time combination and may have selected to watch a special sporting event, such as the WINTER OLYMPICS. As a result, the day/time analysis factor may be updated with an exception that special factors, such as the WINTER OLYMPICS, may override day/time analysis factor. Other factors may be modified or added as a result of the update 222.

Figure 3:
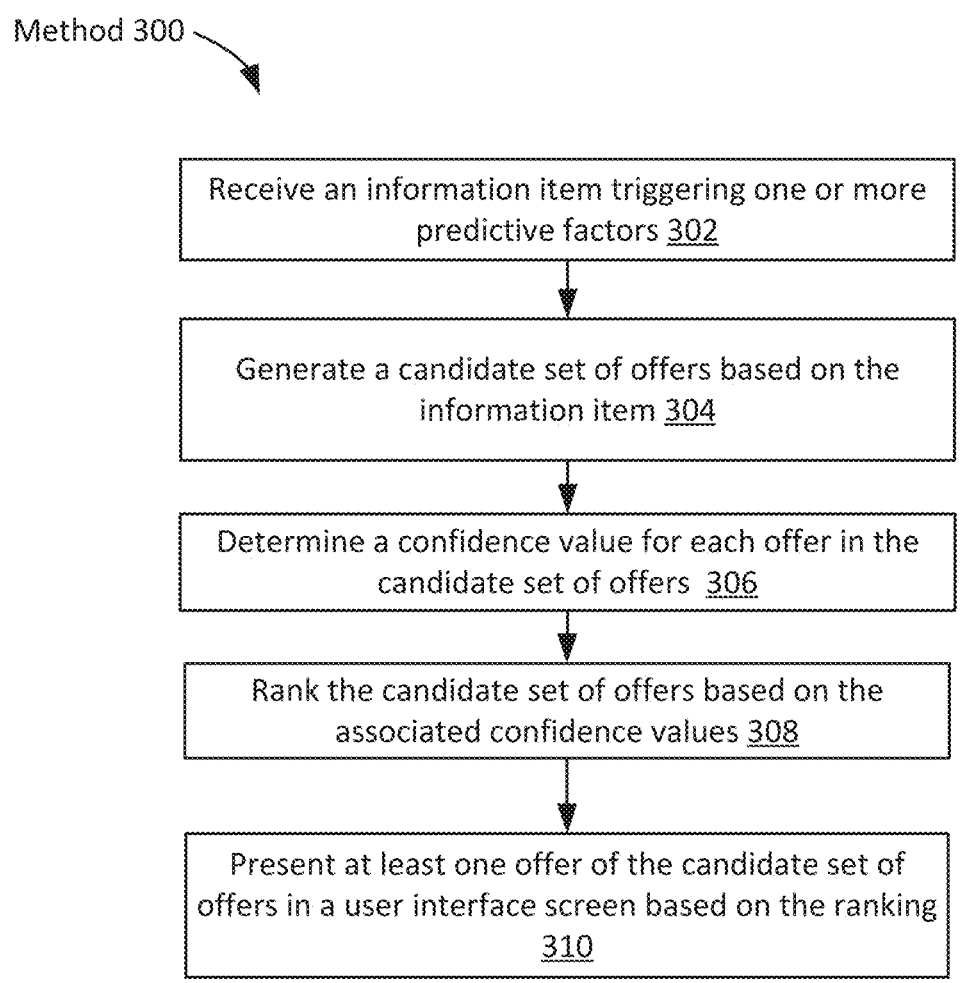
FIG. 3 is a flow diagram of an example process for generating offers to view content on media devices based on predictive factors.

FIG. 3 is a flow diagram of an example process for generating offers to view content on media devices based on predictive factors. A method 300 may include receiving 302 an information item triggering one or more predictive factors. A candidate set of offers may then be generated 304 based on the information item. A confidence value for each offer may be determined 306 in the candidate set of offers. The candidate set of offers may then be ranked 308 based on the associated confidence values. At least one offer of the candidate set of offers may be presented 310 in a user interface screen based on the ranking.

4.0 Implementation Example—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
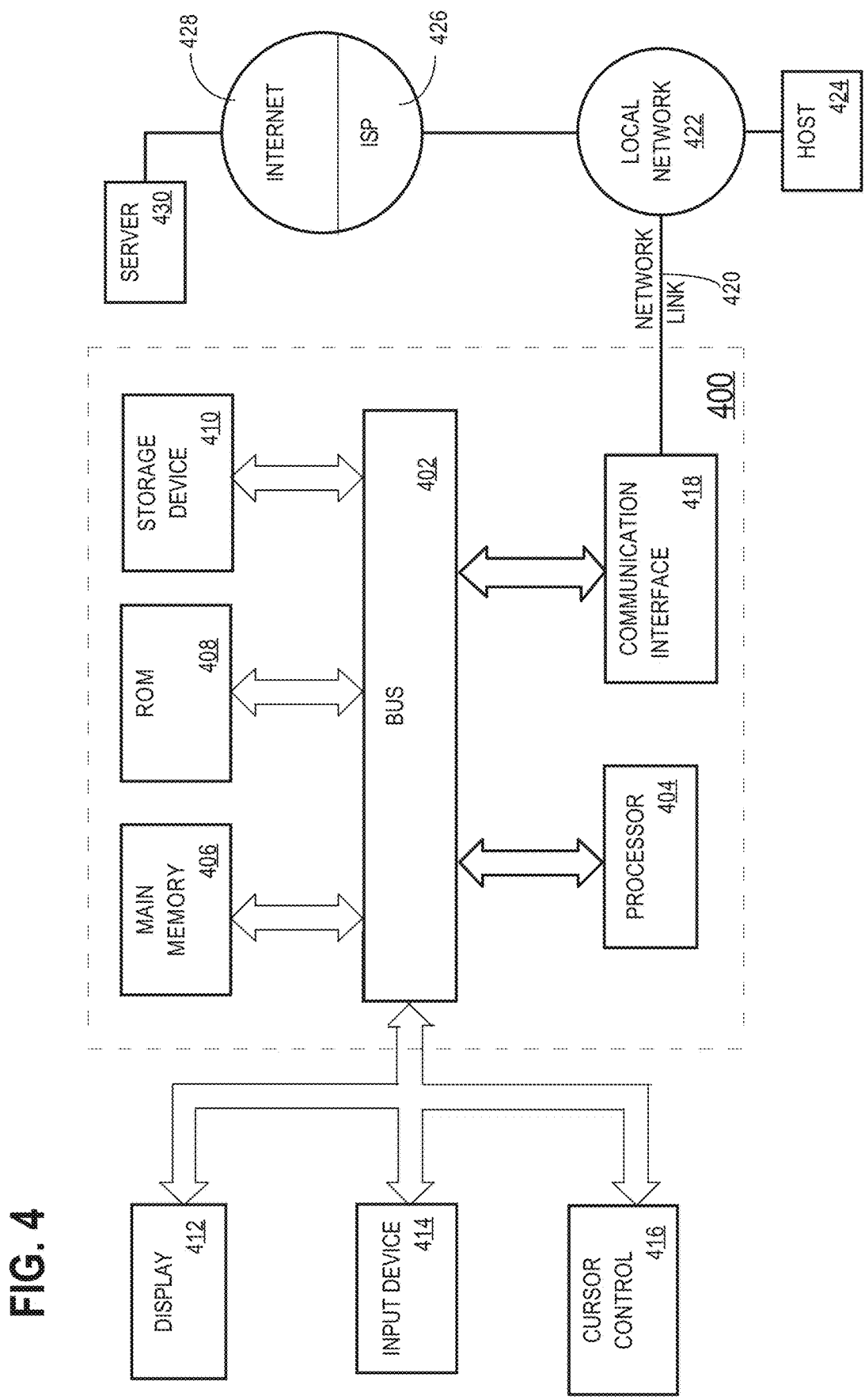
FIG. 4 is a block diagram that illustrates a computer system upon which an embodiment of the invention may be implemented.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

Interpretation of Terms

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

In the appended claims, any clause, element or limitation of a claim that does not include the words "means for" is not intended to invoke or to be construed under 35 U.S.C. § 112(f). In the appended claims, any clause, element or limitation that is expressed as a thing for performing or configured to perform a specified function without the recital of structure, material or acts in support thereof is intended to be construed to cover the corresponding structure, material or acts described in the specification, and any other structure, material or acts that were known or in use as of the priority date to which this patent document is entitled or reasonably foreseeable to those of ordinary skill in the art in view of the disclosure as a whole herein, and equivalents thereof.

Summary

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
determining that a content item was partially viewed;
in response to determining that the content item was partially viewed, boosting a predictive factor associated with the content item;
in response to determining that the content item is an episode of a series, wherein a number of episodes of the series were previously viewed, further boosting the predictive factor associated with the content item;
decaying, after the boosting, the predictive factor at a decay rate over a time period, wherein the time period begins when the partially viewed content item was partially viewed, wherein the decay rate is correlated with the boosting by determining the decay rate based on a same cause for the boosting; and
causing, via a user interface, a display of an offer to view the partially viewed content item, based on the predictive factor.

2. The method of claim 1, wherein the predictive factor is triggered by at least one of (a) a day and time combination associated with a user behavior associated with a particular content item, and (b) partially viewed duration time value associated with a particular content item.

3. The method of claim 1, further comprising:
generating a candidate set of offers by determining the candidate set of offers to view one or more recorded content items available on a media device based, at least in part, on one or more predictive factors associated with the content including at least one or more of linear content, partially viewed content, over-the-top content, recorded asset content, content associated with a collection affinity value, or content associated with a genre affinity value; and
selecting the candidate set of offers based on a variety of metrics associated with each offer of the candidate set of offers.

4. The method of claim 3, wherein generating the candidate set of offers to view content further comprises:
determining a frequency of consumption rate based on user watching behavior associated with the series; and
based on the frequency of consumption rate, determining the candidate set of offers associated with the content including at least one or more of over-the-top content or recorded asset content, the content further comprising a next episode in the series.

5. The method of claim 3, further comprising:
receiving a user input associated with a presentation of at least one candidate offer via the user interface;
updating one or more confidence values associated with the one or more predictive factors associated with the at least one candidate offer based on the user input.

6. A system comprising:
control circuitry configured to:
determine that a content item was partially viewed;
in response to determining that the content item was partially viewed, boost a predictive factor associated with the content item;
in response to determining that the content item is an episode of a series, wherein a number of episodes of the series were previously viewed, further boost the predictive factor associated with the content item;
decay, after the boosting, the predictive factor at a decay rate over a time period, wherein the time period begins when the partially viewed content item was partially viewed, wherein the decay rate is correlated with the boosting by determining the decay rate based on a same cause for the boosting; and
cause, via a user interface, a display of an offer to view the partially viewed content item, based on the predictive factor.

7. The system of claim 6, wherein the predictive factor is triggered by at least one of (a) a day and time combination associated with a user behavior associated with a particular content item, and (b) partially viewed duration time value associated with a particular content item.

8. The system of claim 6, wherein the control circuitry is further configured to:
generate a candidate set of offers by determining the candidate set of offers to view one or more recorded content items available on a media device based, at least in part, on one or more predictive factors associated with the content including at least one or more of linear content, partially viewed content, over-the-top content, recorded asset content, content associated with a collection affinity value, or content associated with a genre affinity value; and
select the candidate set of offers based on a variety of metrics associated with each offer of the candidate set of offers.

9. The system of claim 8, wherein the control circuitry is configured, when generating the candidate set of offers to view content, to:
determine a frequency of consumption rate based on user watching behavior associated with the series; and
based on the frequency of consumption rate, determine the candidate set of offers associated with the content including at least one or more of over-the-top content or recorded asset content, the content further comprising a next episode in the series.

10. The system of claim 8, wherein the control circuitry is further configured to:
receive a user input associated with a presentation of at least one candidate offer via the user interface;
update one or more confidence values associated with the one or more predictive factors associated with the at least one candidate offer based on the user input.

11. The system of claim 6, wherein the control circuitry is configured, when causing, via the user interface, the display of the offer to view the partially viewed content item, based on the predictive factor, to:

provide for display of the user interface a user interface screen including at least one of a feed, a carousel, or a notification screen.

12. A non-transitory computer-readable medium storing instructions, wherein the instructions, when executed by one or more processors, cause the one or more processors to perform:
   determining that a content item was partially viewed;
   in response to determining that the content item was partially viewed, boosting a predictive factor associated with the content item;
   in response to determining that the content item is an episode of a series, wherein a number of episodes of the series were previously viewed, further boosting the predictive factor associated with the content item;
   decaying, after the boosting, the predictive factor at a decay rate over a time period, wherein the time period begins when the partially viewed content item was partially viewed, wherein the decay rate is correlated with the boosting by determining the decay rate based on a same cause for the boosting; and
   causing, via a user interface, a display of an offer to view the partially viewed content item, based on the predictive factor.

13. The non-transitory computer-readable medium of claim 12, wherein the predictive factor is triggered by at least one of (a) a day and time combination associated with a user behavior associated with a particular content item, and (b) partially viewed duration time value associated with a particular content item.

14. The non-transitory computer-readable medium of claim 12, wherein the instructions are further configured to perform:
   generating a candidate set of offers by determining the candidate set of offers to view one or more recorded content items available on a media device based, at least in part, on one or more predictive factors associated with the content including at least one or more of linear content, partially viewed content, over-the-top content, recorded asset content, content associated with a collection affinity value, or content associated with a genre affinity value; and
   selecting the candidate set of offers based on a variety of metrics associated with each offer of the candidate set of offers.

15. The non-transitory computer-readable medium of claim 14, wherein the instructions, when generating the candidate set of offers to view content, further perform:
   determining a frequency of consumption rate based on user watching behavior associated with the series; and
   based on the frequency of consumption rate, determining the candidate set of offers associated with the content including at least one or more of over-the-top content or recorded asset content, the content further comprising a next episode in the series.

16. The non-transitory computer-readable medium of claim 14, wherein the instructions are further configured to perform:
   receiving a user input associated with a presentation of at least one offer candidate via the user interface;
   updating one or more confidence values associated with the one or more predictive factors associated with the at least one candidate offer based on the user input.

17. The non-transitory computer-readable medium of claim 12, wherein the instructions for causing, via the user interface, the display of the offer to view the partially viewed content item, based on the predictive factor further perform:
   providing for display of the user interface a user interface screen including at least one of a feed, a carousel, or a notification screen.

* * * * *